S. GARFIELD.
POTATO SEPARATOR.
APPLICATION FILED MAR. 16, 1916.
1,201,167.
Patented Oct. 10, 1916.
2 SHEETS—SHEET 1.
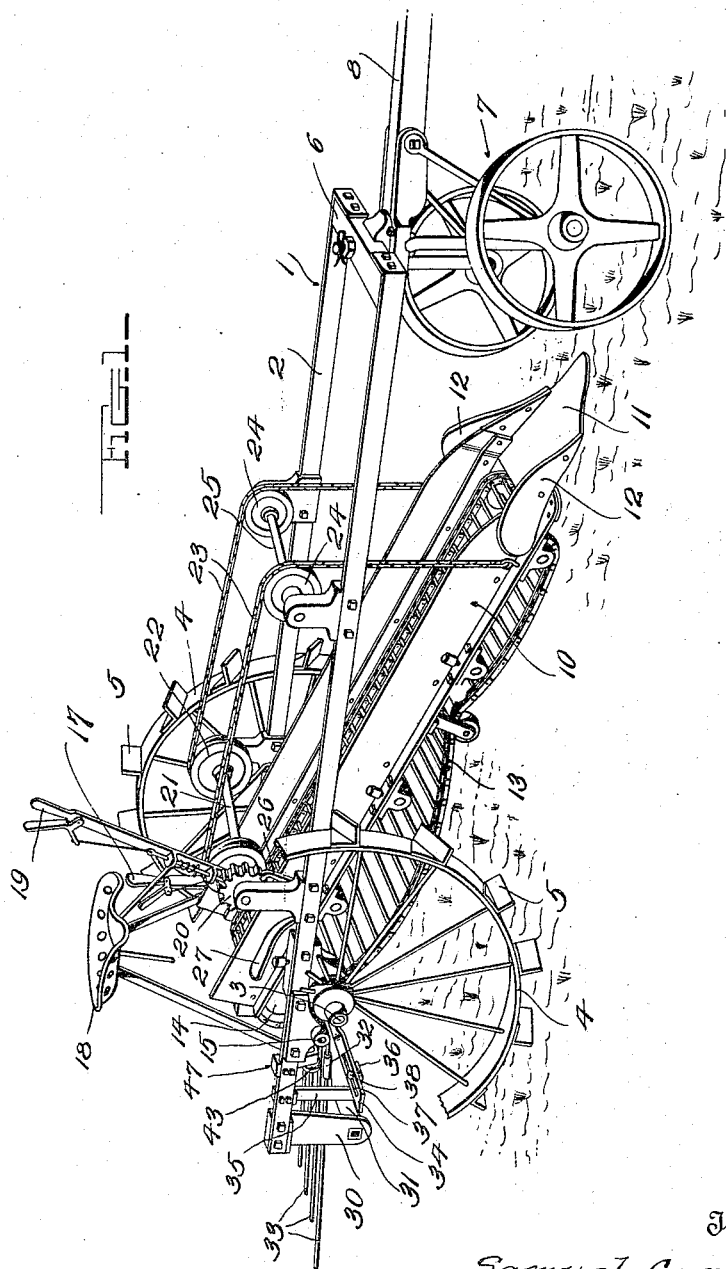
Inventor
Samuel Garfield
Witnesses

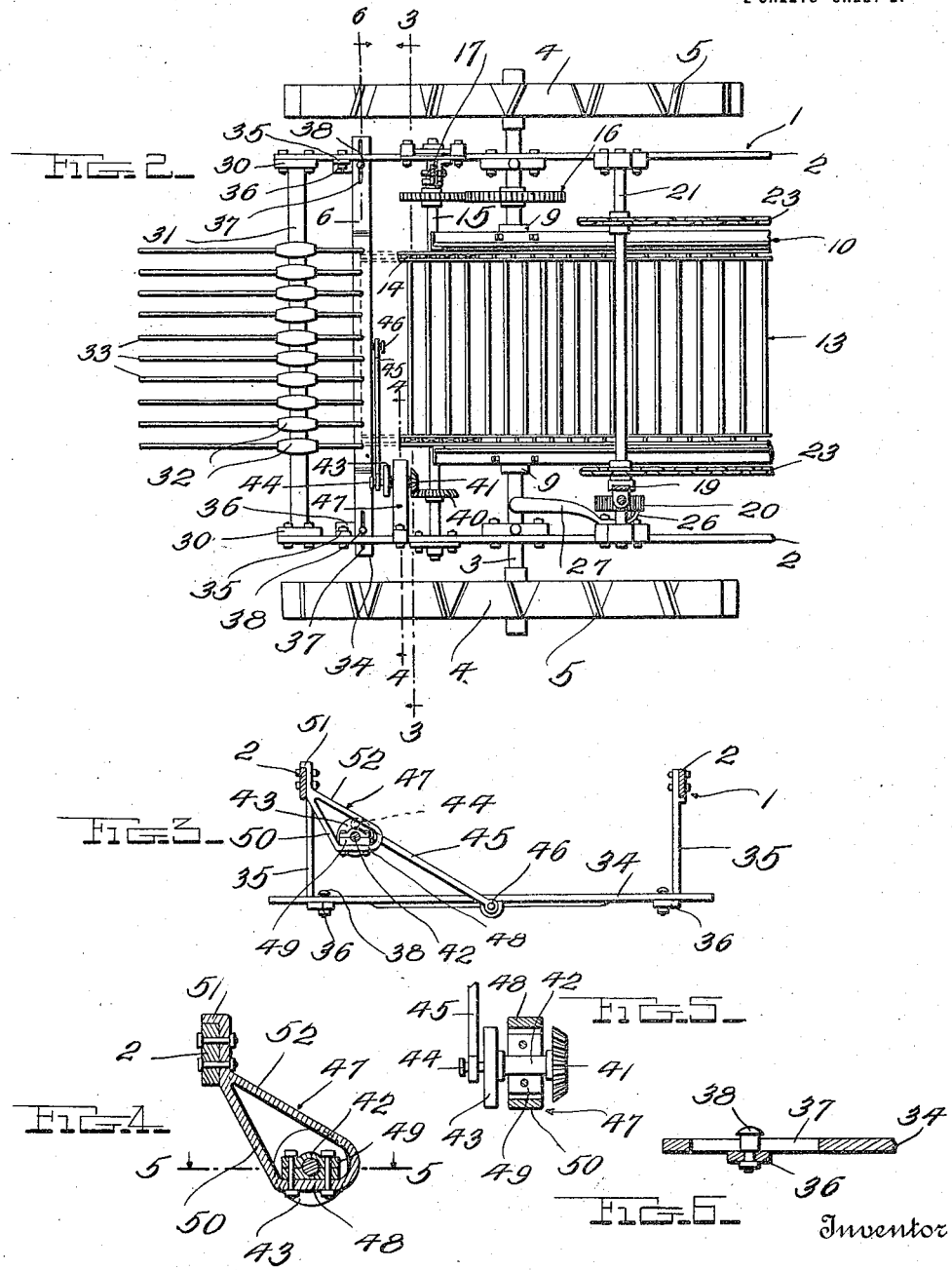

UNITED STATES PATENT OFFICE.

SAMUEL GARFIELD, OF RUSSELL, PENNSYLVANIA.

POTATO-SEPARATOR.

1,201,167.　　　　　Specification of Letters Patent.　　Patented Oct. 10, 1916.

Application filed March 16, 1916. Serial No. 84,655.

*To all whom it may concern:*

Be it known that I, SAMUEL GARFIELD, a citizen of the United States, residing at Russell, in the county of Warren and State of Pennsylvania, have invented certain new and useful Improvements in Potato-Separators; and I do declare the following to be a full, clear, and exact description of the invention, such as will enable others skilled in the art to which it appertains to make and use the same.

My invention relates to improvements over my United States Patent 1,123,514 of January 5, 1915.

Experience has taught that the provision of some simple construction for more effectively mounting the reciprocating bar 31 of said patent and for reciprocating this bar, would be marked improvements and the object of the present invention, therefore, is to overcome the difficulties previously encountered and to provide a machine which will be much more efficient and durable.

With this general object in view, the invention resides in certain novel features of construction and in unique combinations of parts to be hereinafter fully described and claimed, the descriptive matter being supplemented by the accompanying drawings which constitute a part of this application and in which:

Figure 1 is a perspective view of the improved machine; Fig. 2 is a top plan view of the rear end thereof; Fig. 3 is a vertical transverse section on the plan of the line 3—3 of Fig. 2; Fig. 4 is an enlarged vertical section on the plane of the line 4—4 of Fig. 2; Fig. 5 is an enlarged horizontal section on the plane indicated by the line 5—5 of Fig. 4; and Fig. 6 is an additional vertical section taken on the plane of the line 6—6 of Fig. 2.

In specifically describing the construction shown in the drawings above briefly described, similar characters will be placed on corresponding parts throughout the several views and reference will be herein made to the numerous elements by their respective indices. To this end, the numeral 1 represents the frame of the improved machine, said frame including a pair of parallel side bars 2 whose rear ends carry appropriate bearings in which the rear axle 3 is rotatably mounted, said axle having on its ends driving wheels 4 with angle metal calks 5. At the front end of the frame, the side bars 2 are secured to a transverse bar 6 beneath which a suitably constructed front truck 7 is mounted, a tongue 8 being extended forwardly from said truck.

Having bearings 9 mounted on the axle 3, is a conveyer frame 10 which inclines downwardly and forwardly as shown clearly in Fig. 1, said frame having at its front end a shovel 11 whose edges are provided with upstanding mold boards 12, these mold boards being adapted to prevent potatoes from rolling laterally from the shovel 11 in case the machine is being used on the side of a hill.

Operating within the frame 10, is an endless belt conveyer 13 preferably constructed as shown of chains and rods, this conveyer being driven from a pair of sprockets 14 on a transverse shaft 15 in rear of the axle 3, said shaft being rotated by suitable gearing 16 which may be thrown into and out of operation by a hand lever 17 disposed adjacent an appropriate seat 18 which is mounted over the rear end of the conveyer frame 10. Also positioned within easy reach of the operator, is a ratchet lever 19 whose ratchet engages a ratchet wheel 20 secured on a transverse shaft 21, said shaft carrying a pair of grooved pulleys 22 in the grooves of which the rear ends of a pair of chains 23 are secured, the other ends of said chains being connected with the front end of the conveyer frame 10, while their intermediate portions are trained over sheaves 24 carried by a transverse shaft 25.

The lever 19 is obviously to be used for so rotating the pulleys 22 as to wind the chains 23 thereon or to unwind said chains as occasion may demand, thus allowing the conveyer frame 10 to be raised and lowered at will. For holding the shaft 21 in any one of its adjusted positions, a dog 26 is provided, said dog being equipped with a foot pedal 27 whose weight normally holds the dog in operative position. Said pedal may be raised by the operator's foot, however, to release the dog when necessary.

Secured to and depending from the extreme rear ends of the side bars 2, are brackets 30 to which the opposite ends of a centrally depressed transverse shaft 31 are secured, said shaft corresponding to the shaft 20 shown in the patent above referred to. Guides 32 are mounted for oscillation on the shaft 31, said guides receiving the tines 33 of the separating fork. The front ends of the tines 33 are pivoted to a reciprocating bar 34 which corresponds to the bar 31 of my previous patent. As before suggested, the present invention aims to provide efficient mounting and driving means for this bar, this end being attained by the construction now to be described.

Rigidly secured at their upper ends to the bars 2 immediately in advance of the brackets 30, is a pair of hanger bars 35 whose lower ends are provided with integral forwardly extending flanges 36 upon which the opposite ends of the bar 34 rest, said ends being formed with longitudinal slots 37 receiving headed studs 38 secured to the aforesaid flanges. The studs 38 are preferably constructed and held in position as shown in Fig. 6. By mounting the bar 34 in this manner, it is allowed to reciprocate freely yet it may not vibrate excessively as was the case in the old machine, and consequently, the entire device will operate much more smoothly.

For reciprocating the bar 34, a bevel gear 40 is keyed on one end of the shaft 15, said gear meshing with a pinion 41 formed integrally with one end of a longitudinally disposed stub shaft 42, the other end of this shaft having formed integrally therewith a disk 43 equipped with a wrist pin 44 from which a pitman 45 leads to the center of the bar 34, at which point said pitman is pivotally connected to said bar as shown at 46. It has been found that by constructing the parts 41, 42 and 43 in a single piece, much better results can be obtained than by the use of an arrangement such as that shown in Fig. 1 of the above referred to patent.

An improved bracket 47 is provided for mounting the shaft 42, said bracket being L-shaped as shown most clearly in Fig. 4 with its horizontal arm 48 carrying a two-part bearing 49 in which the shaft 42 is mounted. The upstanding arm 50 of the bracket 47 is bolted to the right hand side bar 2 of the frame 1, said arm being provided with an integral flange 51 overhanging said bar. The bracket 47 is effectively braced and thus held against vibration by an inclined bar 52 formed integrally at its lower end with the free end of the arm 48, while its upper end is similarly joined to the intermediate portion of the arm 50.

By constructing the machine as above described, the difficulties heretofore encountered will be overcome and the machine will therefore be highly efficient, running practically without vibration.

From the foregoing, taken in connection with the accompanying drawings, the construction, manner of operation and advantages of the improvements will be readily understood without requiring a more extended explanation. In conclusion, however, I will again direct particular attention to the structure of the bracket 47 and the manner of mounting the reciprocating bar 34, since these constitute the most important features of the aforesaid improvements. It is to be understood, however, that within the scope of the appended claims, numerous minor changes may be resorted to.

I claim:

1. In a potato separating mechanism, a horizontal frame, a separating fork mounted below said frame and consisting of a plurality of tines mounted for horizontal oscillation, a rigid transverse bar to which one end of said tines is pivoted, said bar having longitudinal slots formed in its opposite ends, and means for reciprocating said bar; in combination with a pair of rigid one-piece arms secured to and depending from the frame adjacent the ends of the aforesaid bar, flat horizontal flanges formed integrally with the lower ends of said arms and underlying the slotted ends of the bar to serve as supports upon which the same may slide, and studs secured to and rising from said flanges through the slots, said studs having heads overlying the ends of the bar.

2. In a potato separating mechanism, a horizontal frame, a separating fork mounted beneath said frame and consisting of a plurality of tines mounted for horizontal oscillation, a transverse bar to which said tines are pivoted, a pitman connected with said bar, and a driving shaft having at one end a crank connection with said pitman; in combination with a rigid one-piece L-shaped bracket whose horizontal arm underlies the aforesaid stub shaft and extends transversely thereof, the upright arm of said bracket being secured rigidly to the frame and having a horizontal bracing flange contacting with a portion thereof, a bearing secured rigidly to the upper side of said horizontal arm and rotatably supporting the aforesaid shaft, and a rigid brace bar formed integrally at its upper end with the intermediate portion of the upright arm of the bracket and having its lower end formed integrally with the free end of the horizontal arm of said bracket.

3. A support for the driving shaft of a vibratory potato separator, said support comprising a rigid one-piece L-shaped bracket whose horizontal arm is adapted to underlie said shaft and extend transversely thereof, said arm having a bearing to rotatably receive said shaft, the upright arm of said bracket being adapted to be rigidly secured to a support and having an integral horizontal bracing flange to contact with a portion of said support, and a rigid brace arm formed integrally at its upper end with the intermediate portion of the upright arm of the bracket and having its lower end formed integrally with the free end of the horizontal arm of said bracket.

In testimony whereof I have hereunto set my hand in presence of two subscribing witnesses.

SAMUEL GARFIELD.

Witnesses:
LEAH B. MAIN,
GEORGE F. HENRY.